United States Patent [19]

Blaedel

[11] Patent Number: 4,505,287
[45] Date of Patent: Mar. 19, 1985

[54] FLOW METERING VALVE

[75] Inventor: Kenneth L. Blaedel, Dublin, Calif.

[73] Assignee: United States of America as represented by the United States Department of Energy, Washington, D.C.

[21] Appl. No.: 548,280

[22] Filed: Nov. 3, 1983

[51] Int. Cl.$^3$ ............................................. F16K 17/06
[52] U.S. Cl. ..................................... 137/12; 137/859; 137/508; 137/509; 137/510; 251/334
[58] Field of Search ............... 137/859, 508, 510, 509, 137/12; 251/334

[56] References Cited

U.S. PATENT DOCUMENTS

| | | |
|---|---|---|
| 2,006,319 | 6/1935 | Hueber .............................. 137/859 X |
| 3,190,496 | 6/1965 | Weiland, Jr. et al. .......... 137/859 X |
| 3,322,155 | 5/1967 | Julow . |
| 3,750,699 | 8/1973 | Borg . |
| 3,956,604 | 5/1976 | Larker et al. . |
| 4,051,979 | 10/1977 | Smith ................................. 62/48 X |
| 4,077,569 | 3/1978 | Deines . |
| 4,108,327 | 8/1978 | Shonerd et al. . |
| 4,199,004 | 4/1980 | Wada et al. . |

Primary Examiner—Arnold Rosenthal
Attorney, Agent, or Firm—Paul Davis; L. E. Carnahan; Judson R. Hightower

[57] ABSTRACT

An apparatus for metering fluids at high pressures of about 20,000 to 60,000 psi is disclosed. The apparatus includes first and second plates which are positioned adjacent each other to form a valve chamber. The plates are made of materials which have substantially equal elastic properties. One plate has a planar surface area, and the other a recessed surface area defined by periphery and central lips. When the two plates are positioned in adjacent contacting relationship, a valve chamber is formed between the planar surface area and the recessed surface area. Fluid is introduced into the chamber and exits therefrom when a deformation occurs at positions where they no longer form a valve seat. This permits the metering of fluids at high pressures and at slow variable rates. Fluid then exits from the chamber until an applied external force becomes large enough to bring the valve seats back into contact.

16 Claims, 3 Drawing Figures

FLOW METERING VALVE

FIELD OF THE INVENTION

The United States Government has rights in this invention pursuant to Contract No. W-7405-ENG-48 between the U.S. Department of Energy and the University of California, for the operation of Lawrence Livermore National Laboratory.

This invention relates generally to valves for controlling and metering the flow of fluids suitable for use in feedback control systems, and more particularly, to the control and metering of fluids at pressures of about 20,000 to 60,000 psi at slow rates as low as about 0.00001 lb/min of helium with a dynamic range (the ratio of maximum to minimum) of greater than 100.

BACKGROUND OF THE INVENTION

Numerous valves are known for controlling or metering the flow of fluids, defined herein as the flow of gases and liquids. These valves are suitable for use with fluids pressurized to relatively low pressures which are either flowing with large rates of flow; or are not flowing at all, as when stored in a pressure vessel.

Existing valves are disclosed in: U.S. Pat. No. 3,956,604, dated May 11, 1976, to Larper et al; U.S. Pat. No. 4,077,569, dated Mar. 7, 1978, to Deines; U.S. Pat. No. 4,199,004, dated Apr. 22, 1980, to Wada et al; U.S. Pat. No. 3,322,155 dated May 30, 1967, to Julow; and U.S. Pat. No. 4,108,327, dated Aug. 22, 1978, to Shonerd et al.

Such exemplary valves are unable to meter high pressure fluids, defined herein as pressures of about 20,000 to 60,000 psi, at a slow rate, such as the ability to pressurize a 1 liter vessel with helium at about 25 psi per minute.

Traditional valves typically employ a tapered stem and seat. An exemplary valve is activated by a pneumatic piston through a lever arm. Disadvantages of such a valve system are: the tapered seats cannot repeatedly achieve shut-off at high pressures of greater than about 20,000 psi and are also subject to galling; and the sliding motion within the valve contributes to hysteresis, making it unsuitable for automatic control.

It would be an advancement in the art of valve technology to provide a valve system which could controllably meter high pressures of greater than about 20,000 psi, particularly at a slow rate. It would be a further advancement to achieve the preceding without the occurrence of tangential sliding motion between stem and seat. Another advancement would be to provide a valve system where the indication of flow rate is related to the force applied to the valve rather than as a result of displacement.

SUMMARY OF THE INVENTION

Accordingly, an object of the invention is to provide a valve apparatus suitable for controllably metering high pressures of greater than about 20,000 psi.

Another object of the invention is to provide a valve assembly apparatus capable of metering pressures of greater than about 20,000 psi at a slow rate as low as about 0.00001 pounds mass per minute of helium.

Another object of the invention is to provide a valve apparatus for high pressure metering of fluids which minimizes the tangential sliding motion within the valve.

Still a further object of the invention is to provide a valve apparatus for metering fluids at high pressures which does not employ displacement of the valve.

Additional objects, advantages, and novel features of the invention will be set forth in part in the description which follows; and in part will become apparent to those skilled in the art upon examination of the following or may be learned by practice of the invention. The objects and advantages of the invention may be realized and attained by means of the instrumentalities and the combinations particularly pointed out in the appended claims.

To achieve the foregoing and other objects, in accordance with the purpose of the present invention as embodied and broadly described herein, the valve assembly apparatus of this invention comprises a housing defining an axially extending opening which includes a housing chamber. A first plate is positioned within the housing chamber. The first plate is formed of a plate material which deforms when a predetermined elastic deformation limit is exceeded, and includes a first plate face surface and an opposing planar base surface which includes a fluid inlet port. A second plate, formed of a similar material as the first plate, is positioned within the housing chamber. The second plate has a base surface and an opposing planar recessed face surface which is defined by a periphery lip and a central lip. This central lip includes a fluid outlet port which terminates on a planar central lip face surface. The two plates are disposed within the housing chamber so that in a closed valve position an external base surface pressure applied to each of the base surfaces positions the periphery and central lips in adjacent contacting relationship with the first plate face surface. A valve chamber is formed when the periphery and central lips contact the first plate face surface, and a valve seat formed, in a closed valve position, when the central lip contacts the first plate face surface. Means for supplying an external base surface pressure to each of the plate bases is also provided, as is means for introducing a fluid through the inlet port into the valve chamber. Also included is means for expelling the fluid from the valve chamber through the outlet port during a valve open position. The valve open position occurs when a fluid pressure within the valve chamber is less than the applied external base surface pressure, but exceeds the plate material elastic deformation limit, causing the central lip to become unseated.

In a further aspect of the present invention, in accordance with its objects and purposes, a method for metering a fluid comprises providing the valve assembly apparatus described in the preceding paragraph. External base surface pressure is applied to each of the base surfaces of the plates to position the periphery and central lips of the second plate in adjacent contacting relationship with the first plate face surface. A fluid is introduced into the chamber through the inlet port disposed within the first plate face surface, and fluid is allowed to collect within the valve chamber until the fluid pressure within the chamber is greater than the plate material elastic deformation limit, but less than the external base surface pressure applied to the bases. This causes the central lip to deform and move away from the first plate face surface. Fluid then flows from the valve chamber through the outlet port which terminates on a central lip planar surface. Fluid flowing from the chamber is collected in a collection vessel.

The valve assembly apparatus of the present invention provides for the metering of a fluid at high pressures of about 20,000 to 60,000 psi, and at a slow rate. This is achieved without slippage of the valve seat surface (both gross- and micro-slip), thus minimizing motion which is tangential to the valve seat. Fluids can be readily metered at this high pressure at slow rates without constantly changing the force applied to the valve apparatus, resulting in accurate control of the metering process. The indication of flow rate is not a result of displacement, as in traditional valves, but occurs as a consequence of a force directly applied to the valve.

DESCRIPTION OF THE DRAWINGS

The accompanying drawings, which are incorporated and form a part of the specification, illustrate embodiments of the present invention and, together with the description, serve to explain the principles of the invention.

DETAILED DESCRIPTION

Figure 1:
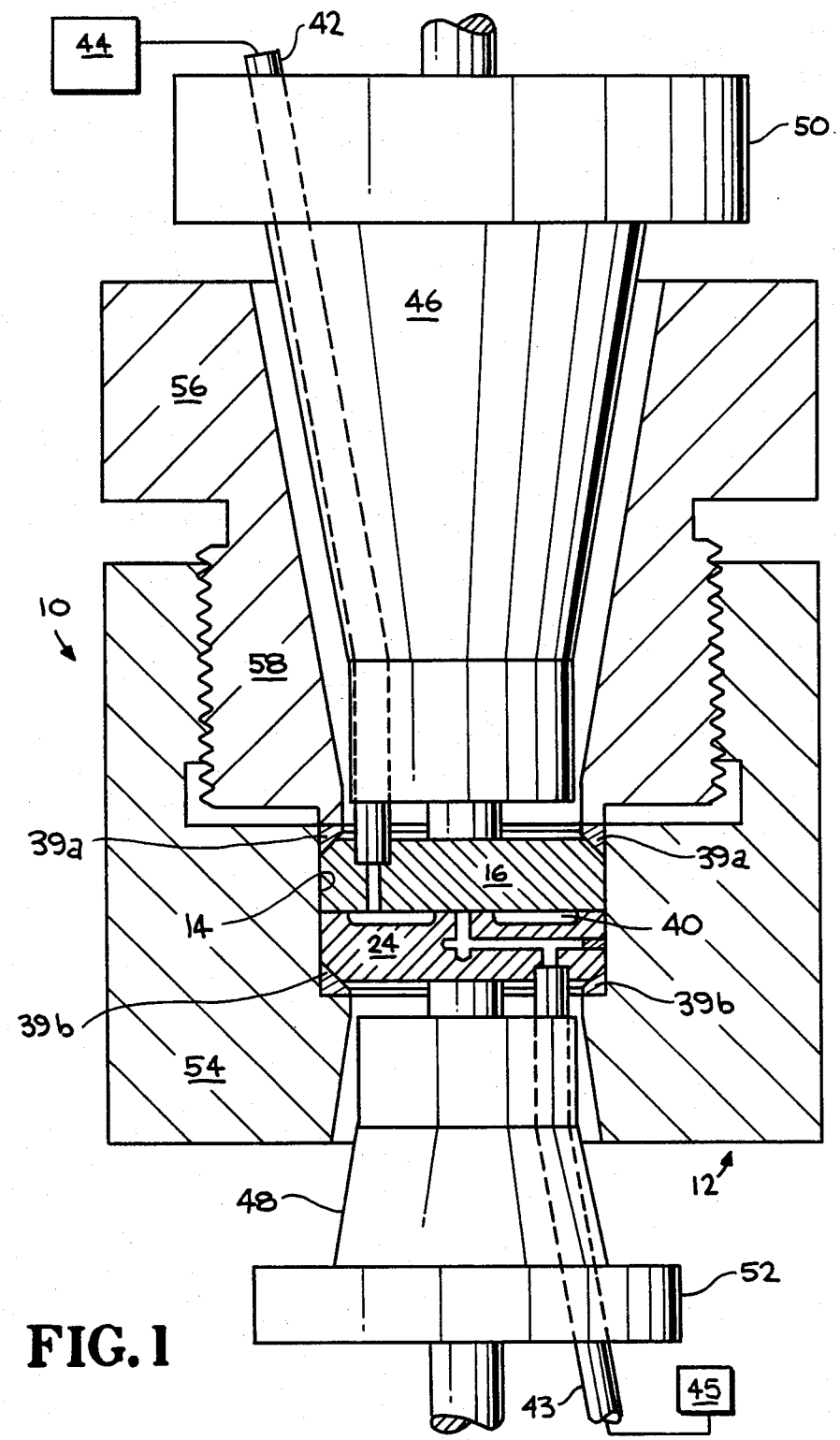
FIG. 1 illustrates schematically one embodiment of the valve apparatus.
Figure 2:
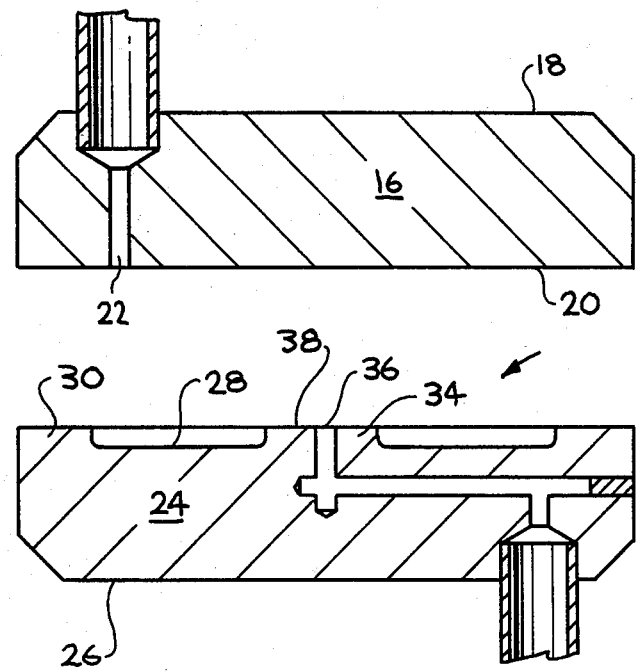
FIG. 2 illustrates the valve of FIG. 1 in greater detail, showing the two plates in spaced apart relationship to more clearly show the plate surface areas. In the position illustrated a valve chamber is not formed.

Referring now to FIGS. 1 and 2, one embodiment of valve assembly apparatus 10 includes a housing 12 defining an axially extending opening which includes a housing chamber 14. A first plate 16 is positioned within housing chamber 14 such that it is capable of axial movement therein unless restraining means is provided. First plate 16 is formed of a material which has a predetermined elastic limit, and includes a first plate base surface 18, an opposing first plate planar face surface 20, and a fluid inlet port 22 (see FIG. 2). A suitable plate material includes, but is not limited to, a maraging steel.

A second plate 24 is positioned within housing chamber 14 such that it is capable of axial movement therein unless restraining means is provided. Second plate 24 can be formed of the same material as first plate 16, or alternatively of a material having similar elastic deformation properties. Second plate 24 includes a base surface 26, and an opposing planar recessed face surface 28 which is defined by a periphery lip 30 and a central lip 34. A fluid outlet port 36 extends through plate 24 with its inner end terminating at a planar face surface 38 of central lip 34 (see FIG. 2).

Of significance to the present invention is the relative surface areas of the two face surfaces. Face surface 20 has a larger surface area than the surface area of central lip 34. Preferably, the difference in surface areas of 20 and 34 is about 10-fold.

To restrain the axial movement of plates 16 and 24 in chamber 14, seals 39a and 39b are provided and positioned adjacent to each plate and the interior wall of the housing forming chamber 14. Seals 39a and 39b are formed of a resilient material, preferably a maraging steel. Their inclusion maintains plates 16 and 24 in a contacting relationship between face surface 20 and periphery lip 30 during both open and closed valve positions, as more fully explained hereafter. Valve chamber 40 is formed at recessed face surface 28 by the contact and subsequent sealing of lips 30 and 34 with first plate surface 20.

The two plates are disposed within housing chamber 14 so that in a closed valve position an external force (described hereinafter) applied to each of base surfaces 18 and 26, respectively, causes periphery lip 30 and central lip 34 to be positioned in adjacent-contacting-sealing relationship with first plate face surface 20 (the closed valve position). In a closed valve position, central lip 34 is positioned in adjacent-contacting-sealing relationship with face surface 20 so as to form a valve seat.

Means is included for introducing a fluid through inlet port 22 into recessed surface 28 which essentially forms valve chamber 40. Exemplary means include, but is not limited to, a conduit 42 operatively connected to inlet port 22 and a fluid source 44. Fluid source 44 is adapted to provide a predetermined pressure to the fluid passing through the conduit and into chamber 40. Conduit 42 extends through first plate 16 to connect inlet port 22 with fluid source 44. An exemplary fluid source 44 includes, but is not limited to, a pump operatively connected to a fluid.

Means is also included for expelling fluid from valve chamber 40 (formed by recessed surface 28) through outlet port 36 during a valve open position operation. The open position occurs when a fluid pressure within valve chamber 40 is less than the external pressure applied to plate base surfaces 18 and 26, respectively, while also being greater than the plate material elastic deformation limit. Such a combination of pressures causes a deformation of central lip 34, causing it to move away from first plate surface 20, and results in the valve becoming unseated. During a valve open operation, pressures within valve chamber 40 exceed the pressures which cause the valve to be seated and results in a very slight deformation of the material at the valve seat (formed by central lip 34). When the pressure within valve chamber 40 decreases and is less than the plate material elastic deformation limit, central lip 34 becomes undeformed and returns to a contacting seated arrangement with first plate face surface 20. Fluid is then prevented from escaping through outlet port 36. In this position, outlet port 36 is secured against first plate face surface 20 to such an extent that a seal is effected.

Means for supplying the pressure to base surfaces 18 and 26, respectively, is included. Such means can comprise first and second piston rods 46 and 48 operatively connected to first and second actuators 50 and 52 and base surfaces 18 and 26, respectively. Each actuator is in turn operatively connected to a source (not shown) for providing pressure. Exemplary sources include, but are not limited to, hydraulic presses, mechanical presses, motorized screw mechanisms, and the like. Conduits 42 and 43 extend through openings in piston rods 46 and 48 and openings in actuators 50 and 52.

In the preferred embodiment of the invention, as illustrated in FIG. 1, housing chamber 14 is defined by a base 54 and a bolt 56. Base 54 is provided with a cylindrical recessed area adapted to receive a cylindrical shaft 58 of bolt 56. Base 54 is provided with a cylindrical recessed area, or chamber 14, which is adapted to receive and securely hold first and second plates 16 and 24. Threads are cut into the outside surface of shaft 58, and the inside surface of the recessed area of bolt 56 is threaded so that shaft 58 can be screwed into base 54.

In this embodiment, first piston rod 46 is slidably mounted in bolt 56, and second piston rod 48 is slidably mounted in base 54. First and second plates 16 and 24 each have a cylindrical geometric configuration; more particularly, first plate face surface 20 has an annular configuration. Periphery and central lips 30 and 34 define an annular second plate recessed surface 28.

Figure 3:
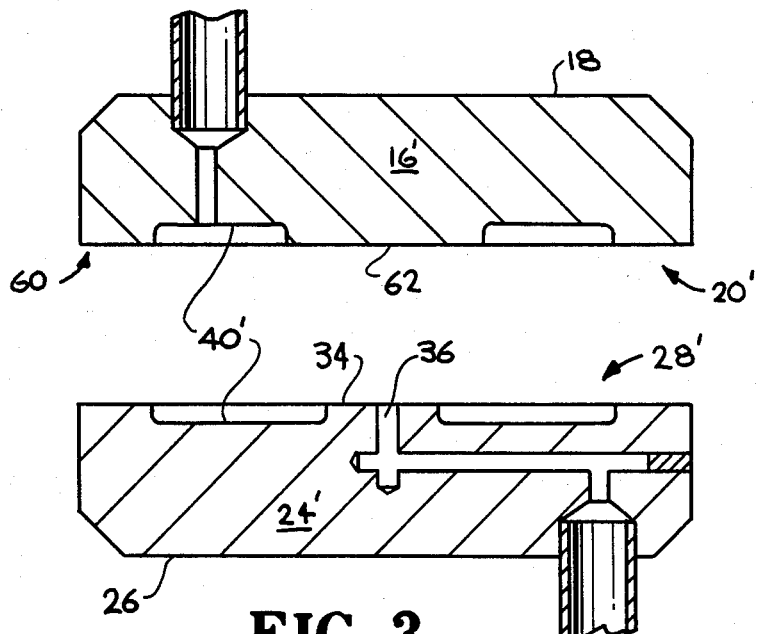
FIG. 3 illustrates another embodiment of the valve apparatus and is shown with the two plates in a spaced apart position. In this position a valve chamber is not formed.

Referring now to FIG. 3, a second embodiment of the invention is illustrated. As shown, first and second plates 16' and 24' are modified such that first plate face surface 20' more closely resembles second plate face surface 28'. As shown, surface 20' includes a periphery lip 60 and a central lip 62 which define a recessed face surface. In this embodiment, central lip 62 has a larger surface area than central lip 34. Thus the volume of valve chamber 40' (formed when the two plates are in an adjacent contacting relationship) is increased.

In yet a third embodiment of the invention (not shown), the surface area of the central lip in one plate is about the same as the surface area of the central lip of the other plate. The two face surfaces of the plates are mirror images of each other.

With reference once again to FIG. 1, during operation of valve assembly apparatus 10, as described above, first and second plates 16 and 24 are initially in a contacting adjacent position with each other. Piston rods 46 and 48 are actuated and apply an external base surface pressure to first and second plate base surfaces 18 and 26, respectively. In the valve closed position, fluid flows from source 44 through conduit 42 and into chamber 40 as it passes through inlet port 22.

Valve assembly 10 is adapted to meter a fluid at a slow rate, as low as about 0.00001 lb/min, with a dynamic range (the ratio of maximum to minimum) of greater than about 10 g and at high pressures of about 25,000 to 60,000 psi. The actual pressures and flow rates are dependent upon a number of factors including but not limited to the rate at which fluid is pumped into valve chamber 40, size of valve chamber 40, elastic deformation limits of first and second plates 16 and 24, as well as the pressure applied to base surfaces 18 and 26.

Fluid pressure within valve chamber 40 is allowed to increase to a valve open pressure at which central lip 34 becomes sufficiently deformed to move away from first plate face surface 20, causing the fluid to flow from chamber 40 and out through outlet port 36. From there it flows through a second conduit 43 to a vessel 45 positioned at the exterior of valve assembly 10. The valve remains open so long as the fluid pressure generated within chamber 40 exceeds the limit at which the plate material elastically deforms.

The preceding description the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A valve apparatus, comprising:
    a housing defining an axially extending opening which includes a housing chamber;
    a first plate positioned within said housing chamber and formed of a plate material which deforms at a predetermined elastic deformation limit, said first plate including a first plate base surface, an opposing first plate planar face surface, and a fluid inlet port;
    a second plate positioned within said housing chamber formed of material similar to that of said first plate, said second plate having a base surface and an opposing planar recessed surface defined by a periphery lip and a central lip, said central lip including a fluid outlet port terminating on a planar central lip face surface thereof, said first and second plates forming a valve chamber at said planar recessed surface when said periphery and central lips are positioned in adjacent contacting relationship with said first plate face surface, and said central lip forming a valve seat in a closed valve position when said central lip contacts said first plate face surface;
    means for supplying an external base surface pressure to each of said plate bases;
    means for introducing a fluid through said inlet port into said valve chamber; and
    means for expelling said fluid from said valve chamber through said outlet port during a valve open position when a fluid pressure within said valve chamber is less than said external base surface pressure and greater than said plate material elastic deformation limit, causing said valve seat to become unseated.

2. The apparatus according to claim 1, further comprising a plurality of resilient seals positioned within said housing opening adjacent said plates to minimize axial movement of said plates therein.

3. The apparatus according to claim 1, wherein said means for introducing a fluid into said valve chamber comprises a conduit operatively connected to said inlet port and a fluid pressure supplying apparatus.

4. The apparatus according to claim 1, wherein said means for expelling said fluid from said valve chamber comprises a conduit operatively connected to said outlet port and to a vessel adapted to receive fluid from said valve chamber.

5. The apparatus according to claim 1, wherein said plate is formed of a material which does not plastically deform until a pressure of about 200,000 psi is attained.

6. The apparatus according to claim 1, wherein said plate material comprises a maraging steel.

7. The apparatus according to claim 1, wherein said valve chamber is capable of withstanding pressures of about 20,000 to 60,000 psi in said closed valve position.

8. The apparatus according to claim 1, wherein said first and second plates each have a cylindrically geometric configuration.

9. The apparatus according to claim 1, wherein each of said first and second plate's base and face surfaces is annular.

10. The valve apparatus according to claim 1, wherein said first plate face surface comprises a planar recessed surface defined by a periphery lip and a central lip which includes a fluid outlet port terminating on a planar central lip face surface thereof.

11. The apparatus according to claim 1, wherein said means for supplying said external base surface pressure comprises first and second piston rods slidably mounted within said housing opening, each of said piston rods being operatively connected to said first and second plates, respectively, when said plates are in a contacting relationship.

12. The apparatus according to claim 12, wherein said piston pressure supply system comprises a hydraulic press.

13. A method for metering a fluid, comprising:
providing a valve apparatus comprising a first plate positioned within a housing chamber and formed from a plate material which deforms at a predetermined elastic deformation limit, said first plate including a first plate base surface and an opposing planar face surface including a fluid inlet port, said valve apparatus further comprising a second plate positioned within said housing chamber and formed of material similar to that of said first plate, said second plate having a second plate base surface and an opposing planar recessed face surface defined by a periphery lip and a central lip, said central lip including a fluid outlet port positioned on a planar central lip face surface thereof;
positioning said plates with said central and periphery lips in adjacent contacting relationship with said first plate surface to form a valve chamber and a valve seat wherein said central lip contacts said first place face surface;
applying an external base surface pressure to each of said base surfaces;
introducing a fluid through said inlet port into said valve chamber; and
pressurizing said valve chamber to a predetermined valve open pressure, causing a deformation of said central lip sufficient as to unseat said valve seat and cause fluid disposed within said valve chamber to exit therefrom through said outlet port.

14. The method according to claim 12, further comprising the operational sequence of allowing said central lip to become undeformed, causing said central lip and first plate face surface to be positioned in an adjacent seated contacting relationship, and thereafter collecting fluid in said valve chamber until pressure generated within said valve chamber causes a deformation of said central lip and movement away from said first plate face surface.

15. The method of claim 12, wherein fluid is allowed to collect within said valve chamber at pressures of about 20,000 to 60,000 psi.

16. The method according to claim 12, wherein fluid is metered into and out of said valve chamber at a rate of as low as about 0.0001 lb/min.

* * * * *